April 28, 1964 F. FISCHER 3,130,702
HYDROFOIL CONTROL SYSTEM
Filed June 12, 1962 2 Sheets-Sheet 2
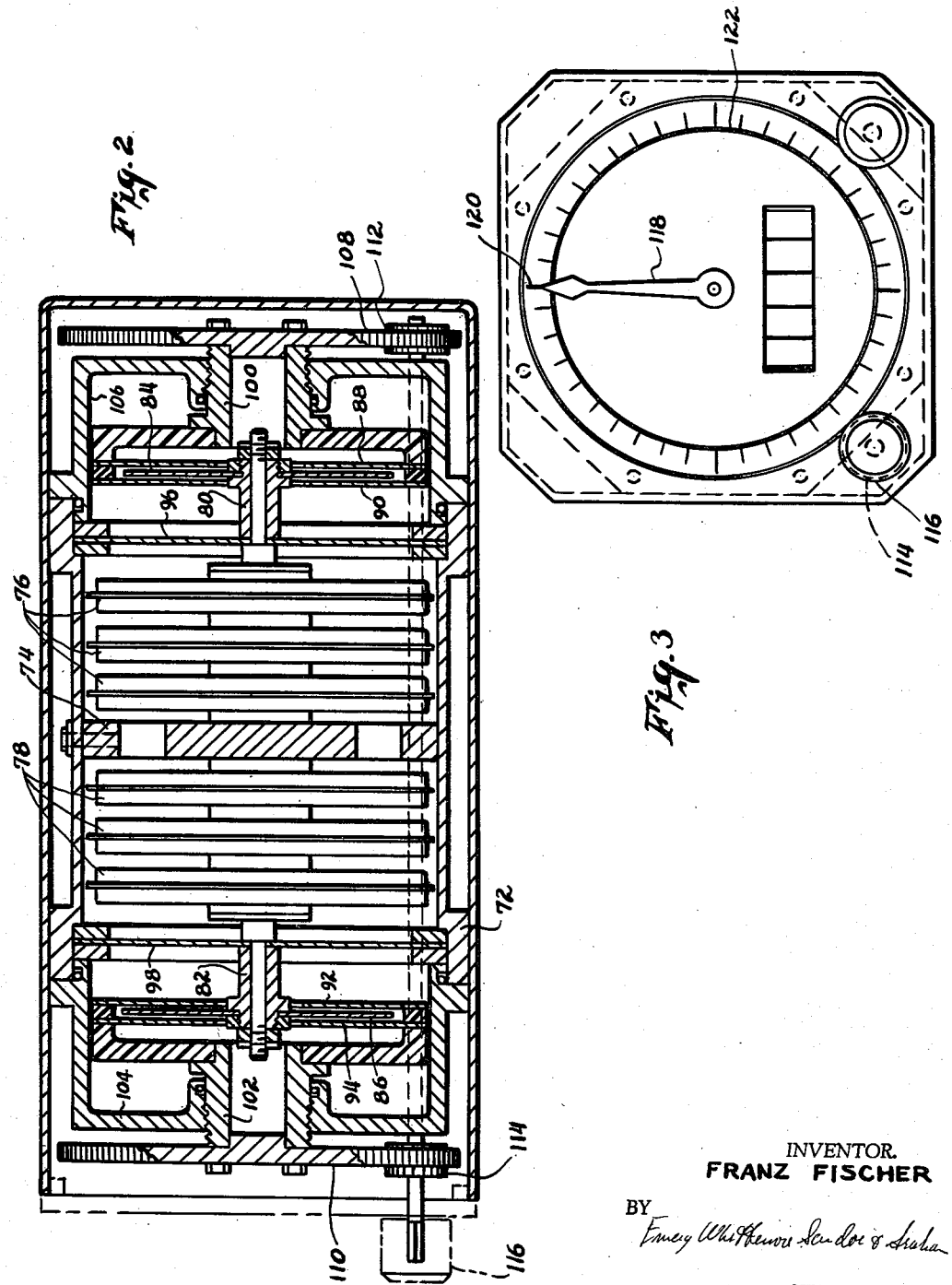
INVENTOR.
FRANZ FISCHER
BY
ATTORNEYS United States Patent Office 3,130,702
Patented Apr. 28, 1964

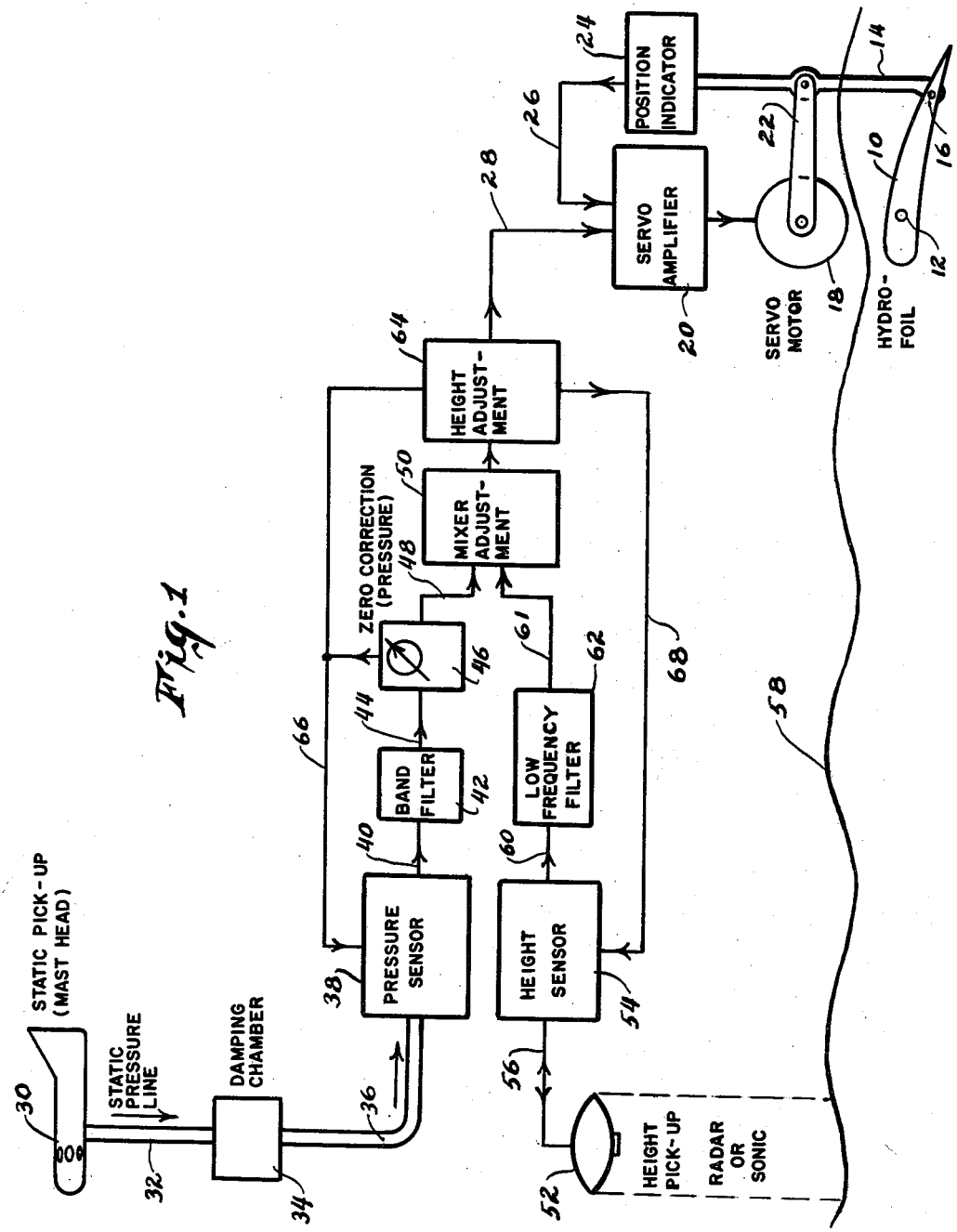

3,130,702
HYDROFOIL CONTROL SYSTEM
Franz Fischer, Port Chester, N.Y., assignor to Melchior International Corporation, New York, N.Y., a Panamanian corporation
Filed June 12, 1962, Ser. No. 201,904
7 Claims. (Cl. 114—66.5)

This invention relates to hydrofoil control systems and, more particularly, to a control system for deep water hydrofoils.

Smooth water hydrofoils such as are popular on small outboards for use in lakes and other bodies of smooth water have been known for a number of years. The advantages of such hydrofoils in enabling high vessel speeds with relatively low propulsive power have, of course, been recognized. Such units are provided with fixed foils and the insertion depth of the foils are self-regulating by balancing lift at the particular operating speed against vessel weight.

However, deep water hydrofoils, that is, hydrofoils operating on ocean going vessels, must control both the insertion depth and the hydrodynamic lift by control of the hydrofoil surfaces. The hydrofoil control system must control the instantaneous lift of the foils to prevent the surface wave conditions from imposing destructive acceleration forces on the vessel or creating unstable lift.

It is, therefore, a primary object of the present invention to provide an improved hydrofoil control system for deep water hydrofoils.

It is a further object of this invention to provide a deep water hydrofoil control system in which means are provided to sense the surface wave conditions and to control the hydrofoil surfaces in accordance therewith.

It is still a further object of this invention to provide a hydrofoil control system having pressure altitude and height above water sensors, and in which the signals therefrom are so combined as to control the hydrofoils in accordance with both desired vessel altitude and wave conditions.

In accordance with these objects, there is provided, in a preferred embodiment of this invention, a hydrofoil having a controllable surface which is driven by a servo system. The hydrofoil may be controlled by changing the angle of attack of all or portions of the hydrofoil or providing deformable or deflectable elements to change the chord of the lift surface thereof. The servo system is driven in accordance with an error signal which is derived from two signals added together.

The first signal is a pressure derived signal and thus controls the absolute altitude of the vessel in terms of a pressure altitude.

The second signal is derived from a measurement of instantaneous distance of the vessel from the surface of the water. These two signals are mixed and filtered so that the pressure signal will control in smooth water or in waves of high recurrence frequency (e.g. wind ripples and waves). When the waves build up to ocean swells, however, the height signal will predominate thereby to cause the vessel to follow the surface contour of the water to eliminate the imposition of high stresses on the vessel surface.

The pressure signal is derived from a static pressure pickup and transformed into electrical signals by a pressure sensor of the null balance type.

The height signal may be derived from a height pickup such as a radar or sonic sensor. The height signal is passed through a low frequency filter and mixed with the pressure signal (corrected for the desired altitude). This mixing is linear addition of the two signals. The signal is then bucked against a bias signal and the difference therebetween constitutes the error signal utilized to drive the servo system.

Having briefly described this invention, it will be described in greater detail in the following portions of the specification which may best be understood by reference to the accompanying drawings, of which:

FIG. 1 is a schematic diagram of the hydrofoil system in accordance with the present invention;

FIG. 2 is a cross sectional view through the pressure sensor used in the system of FIG. 1; and FIG. 3 is a plan view of the indicator face of the sensor shown in FIG. 2.

In FIG. 1, there is shown a hydrofoil control system to control the hydrofoil surface 10 which is rotatably mounted about a mounting pin 12. An actuating lever 14 controllably deflects the hydrofoil surface through a coupling 16 thereto. The actuating lever is moved by a servo motor 18 driven by a servo power amplifier 20. The motor is coupled to the actuating lever 14 through arm 22. The lever is also coupled to a position indicator 24 to generate a position signal which is fed over line 26 to the servo amplifier 20 in bucking relationship to the error signal applied over line 28.

The error signal is derived as a composite signal from two sensing systems, one based on pressure altitude and the other based on height above the surface.

The pressure system is provided with a pressure sampling element 30 which is a static pressure pickup of conventional form. This static pickup 30 is preferably mounted on a mast or similar elevated structure on the vessel so that the pressure measured thereby is free from the effects of surface turbulence. The pressure is conveyed through a line 32, a damping chamber 34 and line 36 to a pressure sensor 38. The damping chamber constitutes a mechanical filter to eliminate from the pressure measurements any fast pressure fluctuations which are due to turbulence.

Thus, the static pickup samples the barometric pressure at the location of the static pickup for a source signal to "fly" the vessel at a preselected altitude determined by the ambient barometric pressure altitude. Thus, this pressure system constitutes, in essence, a measuring device for determining the pressure altitude of the vessel. The pressure sensor 38 converts the pressure measurement to an electrical signal. As will be noted by those skilled to the art, the pressure sensor must be of such design as to allow the necessary sensitivity for detectable measurements of relatively small changes in pressure altitude. A pressure sensor which is capable of such measurements to hold the vessel within a foot of its predetermined altitude is shown in FIG. 2, the explanation of which, however, will be deferred to a later portion of this specification for clarity in explanation.

The electrical signal generated by the pressure sensor is applied over lead 40 to a band pass filter 42 to restrict the signal to the desired operating frequencies and thereby to filter out signals due to noise and the like falling outside of the filter band. The filtered signal is applied over lead 44, through a zero correction element 46, and then over lead 48 to a mixer 50 for combination with the height signal.

The height signal is derived from a height pickup 52 which may conventionally be a height radar transducer. Alternatively, the height measurement may be derived from sonic signals. The height sensor 54 provides the sensing pulse over lead 56 to the pickup 52 and the return signal is transmitted over lead 56 to the height sensor. The height sensor derives an electrical signal responsive to the height of the vessel above the surface 58 of the water and applies the signal over lead 60, a low frequency filter 62 and lead 61 to the mixer 50. The mixer 50 combines the two signals applied over leads 48 and 61 respectively to apply the composite error signal through a height adjustment source 64 to the servo amplifier over lead 28. Since the servo amplifiers conventional to the art are designed to operate from a signal which indicates deviation from a reference level, the height adjustment source 64 is provided to establish the "zero" level from which the error signal will vary (e.g. by a phase shift to indicate direction of change). The zero level may be manually adjusted by the operating personnel of the vessel. The source establishes the "zero" level by a mechanical feed back to the pressure sensor and the height sensor over coupling 66, 68 respectively. Since the barometric pressure will vary due to changes in atmospheric conditions, a zero correction device 46 is provided to establish the "zero" signal level under the atmospheric conditions prevailing at the surface. The pressure correction is similarly coupled over the coupling 66.

Thus, it can be seen that the static pressure signal establishes an absolute plane of pressure altitude by measurement of barometric pressure and will provide a signal in proportion to the deviation of the vessel from this plane.

The height signal provides a measurement of the instantaneous height of the ship above the surface of the water.

With small waves such as a wind-generated chop, large vessels will be able to proceed through the waves without difficulty. Thus, under such conditions, the pressure altitude must control the servo positioning of the hydrofoil. In order so to do, the low frequency filter 62 in the height signal branch will filter out any signals due to the return from the chop (a high frequency signal). On the other hand, when the ship encounters long period sea waves of substantial magnitude, the ship should follow the surface of these waves in order that the hull does not cut through the crests. For example, if the vessel is 100 feet long and anticipates operation at a speed of 100 feet per second, it will have to follow the surface of the waves when the waves, for example, have 800 foot crest to crest period. At this speed, the frequency of the signal generated by the height measuring equipment will be ⅛ of a cycle per second. To pass this signal, the low frequency filter 62 must pass a frequency band up to ⅛ of a cycle per second. The higher frequencies as, for example, those generated by chop are undesirable and control of the hydrofoils is filtered out. The low frequency filter 62 must, thus, pass essentially D.C. to, for example, ⅕ of a cycle per second signals. For this purpose, conventional mechanical-electrical filters may be employed as, for example, the gyro filters known to the art. Pneumatic filters are also suitable.

On the other hand, the pressure sensor must establish an absolute plane. Thus, the band pass filter 42 will pass a frequency range of ⅕ of a cycle per second and higher. For practical consideration (for example, the fall off characteristics of each filter), it is obviously necessary to overlap the frequencies passed. The band pass filter 42 may be limited on the high side to further protect against the passage of signals generated by turbulence and noise in the sensor system.

The signals are mixed in the mixer 50 which merely linearly adds to the subaudio electrical signals. It is preferable to provide means for adjusting the relative ratios between the signals to enable simple control over the acceleration forces applied to the vessel. The mixer 50 may, for example, comprise a center tapped resistance element having terminals at each end thereof. One signal is applied between one end terminal and the center tap, the other signal is applied between the other end terminal and the center tap. The polarities of the signals are additive and an output signal may be derived from the end terminals corresponding to the linear addition of the two signals. Preferably, however, the output signal derived from two variably positioned output taps which can be moved between the respective end terminals and the center tap to enable adjustment of the relative weights to be given the linearly added first and second signals.

A pressure sensor suitable for the precise measurements necessary in this application is shown in FIG. 2 which shows a housing 72 having a transverse member 74 on which is mounted a plurality of capsules 76 and 78. In order to obtain the sensitivity for measurement of the pressure differences corresponding to one or two inches of altitude, the capsules are preferably fabricated as disclosed in U.S. Patent No. 2,760,260. As the static pressure changes, the capsule stack 76 will move armature 80 and the capsule stack 78 will move armature 82 in accordance with the measurement thereof. Secured to the armatures 80 and 82 are capacitor plates 84 and 86 respectively which operate between the spaced capacitor plates 88, 90 and 92, 94, respectively. To prevent tilting of the plates, the armatures 80, 82 are restricted to straight line motion by spider springs 96 and 98 respectively. The capacitor plates are connected in conventional capacitor pickup circuitry so that deviations of the armature mounted plates 84 and 86 from a center position between the plates 88, 90 and 92, 94, respectively, will generate an electrical signal responsive to this movement. The stroke of the capsules is about 0.0045 in. for control of the ship's pressure altitude.

Since, however, the atmospheric conditions will generate changes in the ambient barometric pressure at the water surface, means are provided to establish the null balance position of the capacitor plates.

These means comprise mounting the capacitor plates 88, 90 on a hub 100 and plates 92, 94 on hub 102.

The hubs are threadably received within mounting brackets 104, 106 respectively and are rotatably driven by the gears 108, 110 which engage pinions 112, 114 respectively. Thus, for example, when the vessel is at the sea level, the knob 116 could be rotated until the indicator 118 is positioned at the zero indication 120 on the zero correcting indicator 122. This would correct for the ambient barometric pressure. Similarly, for height adjustment provided from the source 64, the knob 116 could be rotated until the indicator 118 indicates the desired height at which the vessel is to "fly."

The sensor is of balanced construction having matching capsule stacks so that acceleration forces on the stack will be self-compensating since the capacitor pickups are serially connected. The sensor is preferably located at the center of gravity of the vessel so that the acceleration forces due to angular movements of the vessel will be held to a minimum.

Thus, the hydrofoil system in accordance with the present invention will primarily establish a fixed pressure altitude for the vessel which fixed altitude reference will, however, be overcome in the presence of long period (high amplitude) waves so that the vessel can follow the wave surface under such conditions. Thus, the control system is operatable under most deep water conditions encountered by hydrofoil vessels. When the waves are of high magnitude and short period, no provisions for measurement need be made since hydrofoil vessels will be unable to operate in such conditions.

This invention may be variously modified and embodied within the scope of the subjoined claims.

What is claimed is:

1. A hydrofoil system comprising a hydrofoil, said hydrofoil having a surface deflectively mounted to control the lift characteristics of the hydrofoil, a servo system responsive to an input signal to control the deflection of said deflectible surface, a pressure sensor to generate a first electrical signal in response to measured barometric pressure, a band pass filter coupled to said sensor to reject low frequencies in said first signal, a height sensor to generate a second electrical signal in response to measurement of the instantaneous height of the vessel over the surface of the water, a low pass filter coupled to said height sensor to reject high frequencies in said second signal, means coupled to said band pass filter and said low pass filter to linearly add the filtered first and second electrical signals and to generate said input signal responsive to said addition, and means to couple said input signal to said servo system.

2. A control system in accordance with claim 1 in which said band pass filter will reject frequencies below ⅕ cycle per second and said low pass filter will reject frequencies higher than ⅕ cycle per second.

3. A control system in accordance with claim 1 which includes means for setting the zero level of said first and second signals.

4. A control system in accordance with claim 1 in which said adding means includes means for selecting the ratio of said first and second signals which are added together.

5. A control system in accordance with claim 1 which includes means for setting said pressure sensor to the ambient barometric pressure.

6. A control system in accordance with claim 1 in which said pressure sensor comprises a static pressure pickup and a pressure signal sensor comprising a plurality of stacked capsules, a plate moved by deflection of said capsules, and capacitor plates mounted astraddle said plate.

7. A control system in accordance with claim 6 which includes means for moving said capacitor plates to an initial position corresponding to the ambient barometric pressure and the desired height of the vessel.

References Cited in the file of this patent

UNITED STATES PATENTS

| | | |
|---|---|---|
| 2,693,921 | McKissack | Nov. 9, 1954 |
| 2,809,340 | Bernhart | Oct. 8, 1957 |
| 2,930,035 | Altekruse | Mar. 22, 1960 |

FOREIGN PATENTS

| | | |
|---|---|---|
| 1,198,513 | France | June 15, 1959 |
| 713,943 | Great Britain | Aug. 18, 1954 |